Sept. 30, 1958 C. W. WEST 2,853,749
THRESHOLD
Filed May 24, 1956 2 Sheets-Sheet 1
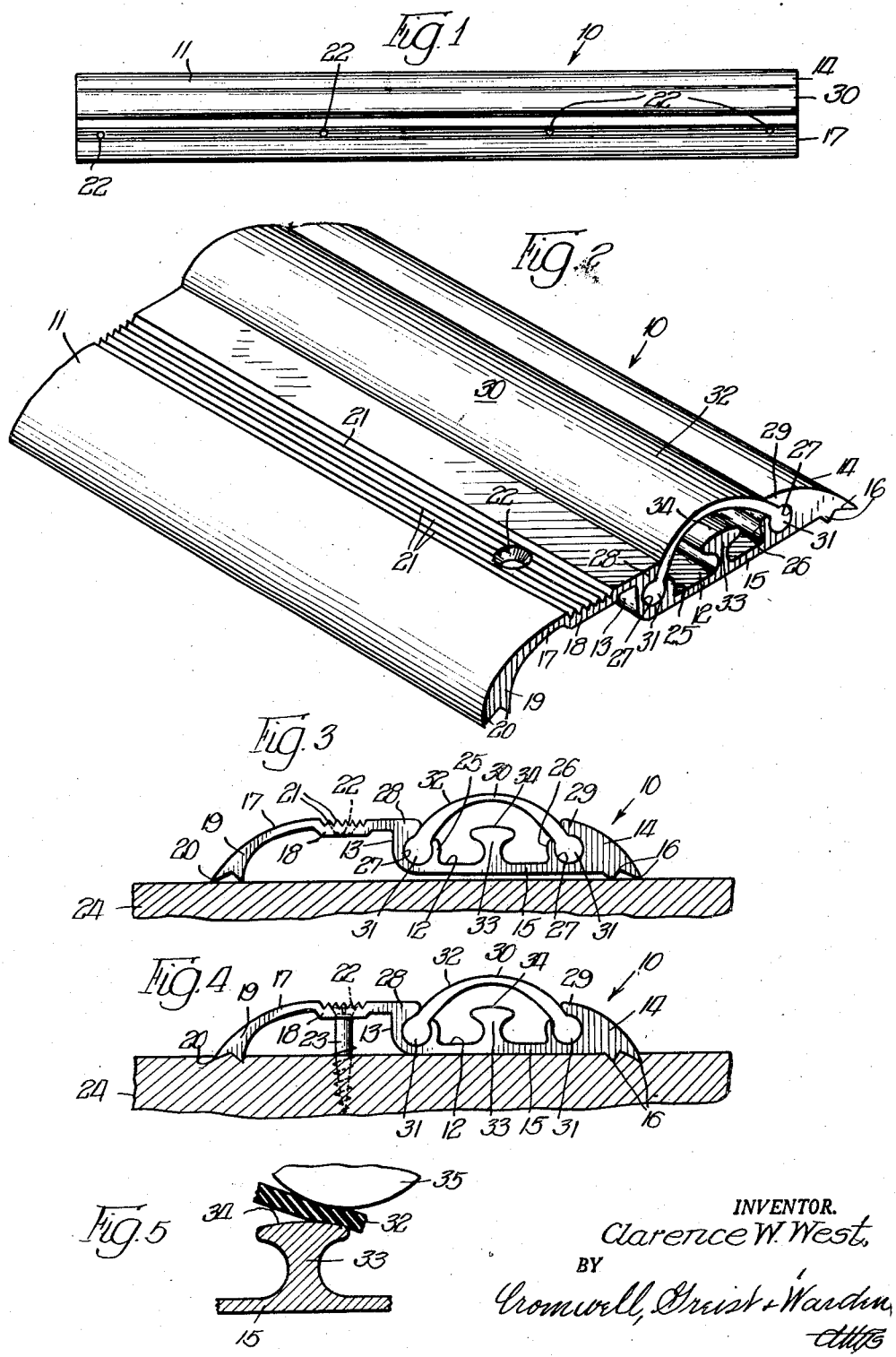
INVENTOR.
Clarence W. West,
BY
Cromwell, Greist & Warden Sept. 30, 1958     C. W. WEST     2,853,749
THRESHOLD
Filed May 24, 1956     2 Sheets-Sheet 2
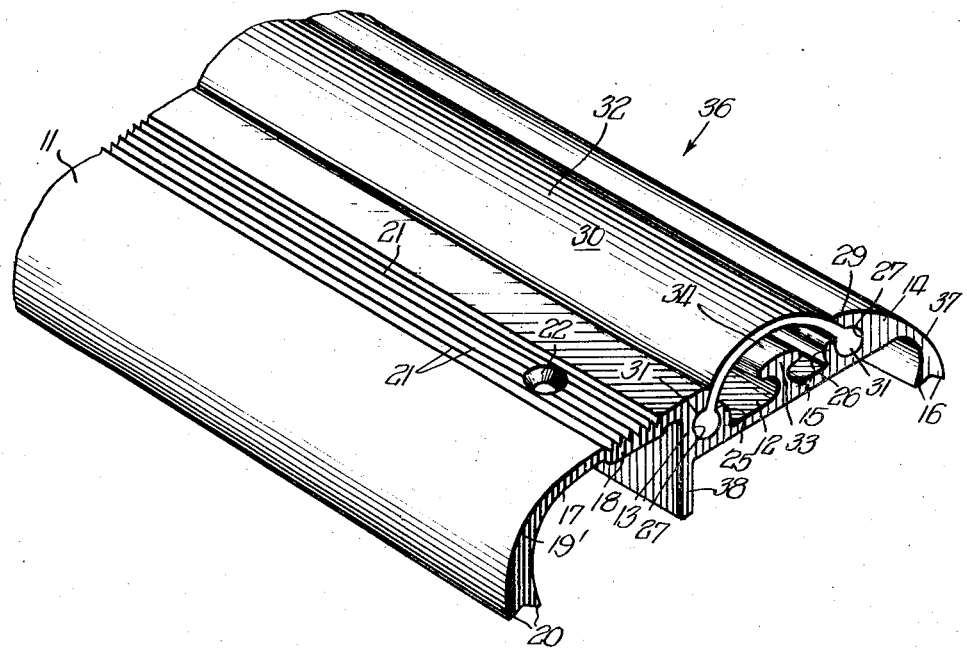
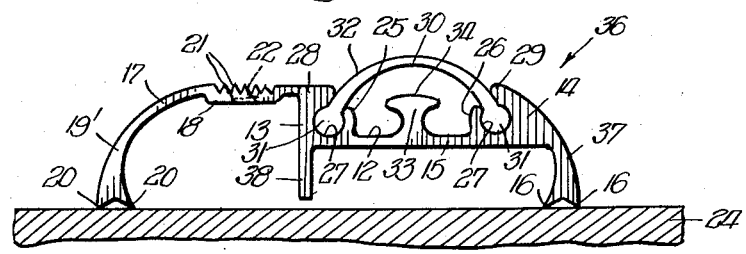
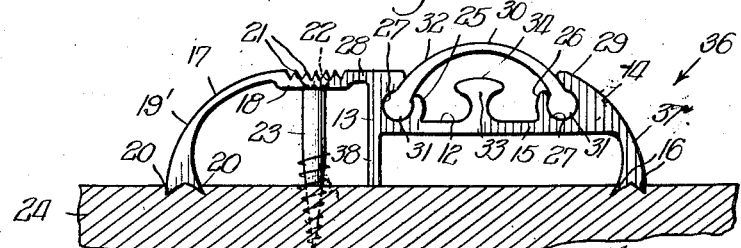
INVENTOR.
Clarence W. West,

United States Patent Office 2,853,749
Patented Sept. 30, 1958

2,853,749
THRESHOLD

Clarence W. West, Oak Park, Ill., assignor to United Industries, Inc., Chicago, Ill., a corporation of Illinois Application May 24, 1956, Serial No. 587,012

17 Claims. (Cl. 20—64)

The present invention relates generally to new and improved sealing strip assemblies particularly adapted for use with movable structures such as doors and the like. More specifically, the present invention is directed to new and improved self-sealing thresholds adapted for application to the threshold receiving portion of a doorway for sealing engagement with the bottom surface of a door to eliminate the passage of air and weather elements therebeneath.

It is an object of the present invention to provide a fully complemented self-contained sealing strip assembly particularly adapted for use as a threshold which is capable of providing efficient sealing engagement with an exposed surface, such as the bottom surface of a door, without the necessity of relying on the use of separate cooperating elements mounted on the surface to be sealed.

Another object is to provide a lightweight, low cost sealing strip which includes the use of a flexible gasket arranged and adapted for efficient sealing contact with a movable surface, which gasket conforms with any irregularities or variations in the surface to be sealed and is furthermore capable of establishing self-adjusting efficient sealing engagement with such variable surfaces.

A further object is to provide a fully complemented self-contained threshold plate easily installed and maintained, which is of sturdy construction having intermediate portions which may be brought into surface area supporting engagement with the base on which it is mounted thereby allowing the same to withstand considerable abuse in use without structural failure or dislodgment and thereby efficiently carry out its intended function of maintaining sealing engagement with a movable surface brought into contact therewith.

Still another object is to provide a new and improved threshold which makes use of a single flexible gasket-like sealing element mounted in a plate in sealing relation therewith and internally supported against excessive deflection by a surface incapable of harming the material of the gasket, the plate being further provided with a depressed portion of substantial volume with which the sealing element and deflection limiting surface are associated, the deflection limiting surface being so constructed as to shed foreign particles into the depressed portion thereby eliminating abrasive damage to the sealing element upon contact of a portion of the same with the deflection limiting surface.

An additional object is to provide an improved threshold plate which is adapted for being tensioned into mounting relation with a structural supporting base in such a manner as to improve the load-bearing support properties of the plate while at the same time maintaining a simplified structure of low cost manufacture.

Other objects not specifically set forth will become apparent from the following detailed description made in conjunction with the drawing wherein:

Fig. 1 is a plan view in reduced scale of the sealing strip of the present invention;

Fig. 2 is a fragmentary perspective view of the sealing strip;

Fig. 3 is an end elevation of the strip illustrating the positioning of the same on a structural supporting base shown in fragmentary vertical section prior to the fastening of the strip thereto;

Fig. 4 is a view similar to Fig. 3 illustrating the relation of the sealing strip with the structural supporting base following the attachment of the strip thereto;

Fig. 5 is an enlarged fragmentary elevation of an abutment rib carried by the sealing strip illustrating its functioning in limiting the deflection of a gasket carried by the strip when the same is deflected in response to contact with an object;

Fig. 6 is a fragmentary perspective view of a modified form of sealing strip incorporating the principles of the present invention;

Fig. 7 is an end elevation of the modified strip of Fig. 6 illustrating the positioning of the same on a structural supporting base shown in fragmentary vertical section prior to the fastening of the strip thereto; and Fig. 8 is a view similar to Fig. 7 illustrating the fastening of the strip to the base.

The threshold shown in Figs. 1–4, generally designated by the numeral 10, is formed from a base plate 11 of generally outwardly convex shape provided with a groove or depressed portion 12 of substantially rectangular cross section extending longitudinally thereof. The depressed portion 12 is generally hollow and is defined by side walls 13 and 14 and a bottom wall 15. The outer bottom surface of the bottom wall 15 is flat and integrally joins the bottom surface of the side wall 14 in coplanar relation therewith to define a continuous flat bottom surface extending substantially to one side margin of the plate 11.

The side wall 14 extends outwardly from the depressed portion 12 and is inclined in a downwardly direction toward the outer margin thereof. The flat bottom surface of the side wall 14, just inwardly of its outer margin, is provided with downwardly projecting, longitudinally extending V-shaped ribs 16 which define spaced teeth, the function of which will be subsequently described. The side wall 13 is substantially vertical and is provided at the top portion thereof with an integral outwardly directed flange member 17. The flange member 17 is formed from a generally horizontal center portion 18 and an outwardly extending, downwardly inclined outer portion 19. The bottom margin of the downwardly inclined portion 19 is provided with longitudinally extending, spaced V-shaped ribs 20 which define teeth-like elements similar to the ribs 16. The generally horizontal center portion 18 of the flange member 17 is provided along the top surface thereof with a series of spaced upwardly directed V-shaped ribs 21 which extend longitudinally thereof and define a non-skid or roughened frictional area to reduce slipping when the threshold is walked upon by an individual. At longitudinally spaced intervals along the roughened area are downwardly directed apertures 22 extending through the horizontal center portion 18 and adapted to receive fastening means such as a screw 23 to fasten the threshold 10 to a structural supporting base 24.

The hollow depressed portion 12 extends downwardly from the plate 11 a substantial distance to define an enlarged gasket-carrying portion. Inwardly of the side walls 13 and 14 and extending upwardly from the bottom 15 are laterally spaced arcuate ribs 25 and 26. The inner surfaces of the ribs 25 and 26 are concave while the outer surfaces are convex and the inner concave surfaces cooperate with the respective side walls to define semi-circular grooves 27 which extend longitudinally of the plate 11. The semi-circular grooves 27 are provided with axially extending, radially directed openings as defined by the spacing between the upper ends of the ribs 25 and 26 with overhanging surfaces 28 and 29 respectively.

A sealing gasket 30 of bowed or semi-circular outline, in its mounted condition, is carried by the plate 11. The gasket 30 along its side margins is provided with beads 31 which are received within the grooves 27 and at least substantially fill the same. The gasket 30 is provided with a central body portion 32 which is integral with the beads 31 and which is of reduced thickness toward the center thereof to impart increased flexibility thereto. The body portion 32 of the gasket 30 extends outwardly of the grooves 27 through the radially opening slots defined by the ribs 25, 26 and the overhanging portions 28, 29 and substantially fills the slots so as to promote a sealing relation with the exposed edges of the plate in contact therewith thereby preventing the collection of foreign material such as water and dirt either within the grooves 27 or in the depressed portion 12.

Extending upwardly from the central portion of the bottom wall 15 of the depressed portion 12 is a deflection limiting rib 33 which expands laterally in an upwardly direction to provide an oval-shaped top portion below the inner surface of the body portion 32 of the gasket 30. The top surface 34 of the deflection limiting rib 33 is convex conforming generally with the concave shape of the inner surface of the body portion 32. The surface 34 is adapted to abut the inner surface of the body portion 32 of the gasket 30 to limit downward deflection of the same upon contact of the outer surface of the body portion 32 with an object. This particular function will subsequently be more fully described.

Referring in particular to Figs. 3 and 4, the mounting of the threshold 10 with respect to a structural supporting base 24 and the manner of tensioning the same with respect to the base will now be described. As shown in Fig. 3, the threshold 10 is resting on the surface of the structural base 24 and the bottom surface of the bottom wall 15 of the depressed portion 12 is spaced above the top surface of the base 24. A fastening means, such as a screw 23 shown in Fig. 4, is passed through the plurality of spaced apertures 22 in the horizontal center portion 18 of flange member 17 and threadedly advanced into the structural base 24. In doing so the spaced imbeddable teeth 16 and 20 are forced down into the surface of the base 24 and grip the same in such a manner as to eliminate lateral displacement of the threshold 10 even though the same is subjected to disturbing forces of considerable magnitude. The advancing of the fastening means 23 into engagement with the base 24 places the plate 11 under tension and ultimately brings the bottom surface of the bottom wall 15 of the depressed portion 12 into substantial abutting engagement with the top surface of the structural base 24.

As is apparent in the views of Figs. 3 and 4, the flat bottom surface defined by the bottom wall 15 combined with the flat bottom surface of the side wall 14 extends a considerable lateral distance with respect to the overall lateral width of the plate 11 and upon the abutment of the same with the top surface of the structural base 24, the plate is brought into supporting contact with the base 24 throughout a substantial area thereof. As a result of the tensioning of the bottom surface of the plate 11 into substantial contact with the top surface of the structural base 24 the plate 11 is capable of withstanding considerable abuse during its use as a threshold and will not become loosened during use nor will it buckle when subjected to loads.

The gasket 30 is preferably formed from plastic materials, such as a vinyl plastic, which are long wearing and which exhibit adequate flexibility to conform with variations in surfaces to be sealed. Any suitable gasketing material may be used to form the sealing means 30 as long as proper flexibility and wear properties are present.

The gasket 30 provides a highly efficient seal which is capable of eliminating the passage of air or liquids from one side to the other when the outer surface thereof is in sealing engagement with the bottom surface of a door or the like.

To maintain the proper bowing or arching of the body portion 32 of the gasket 30 when the same is subjected to a load which is capable of forcing portions thereof downwardly into the depressed portion 12, the central rib 33 is provided to limit deflection of the same to an extent that a reverse bend is not brought about in the body portion of the gasket or the same is not deflected to an extent that damage is done thereto. As illustrated in Fig. 5 an object such as 35 may depress the body portion 32 of the gasket 30 downwardly into the depressed portion 12 of the plate 11. Deflection of the body portion 32 is limited by abutment with the convex surface 34 of the central rib 33. The edges of the top surface 34 are rounded so as to eliminate damage to the inner surface of the body portion 32 by contact of these edges with the material of the gasket. Furthermore, abrasive foreign material will not collect on the top surface 34 but will fall or roll into the bottom portion of the depression 12 which has a substantial volume. As a result, upon deflection of a portion of the gasket 30 into contact with the surface 34, the inner surface of the gasket will not be torn or damaged by collected foreign material. The limiting of deflection occurs where an object 35, such as the heel of an individual's shoe, contacts the gasket 30 and is capable of forcing the same downwardly past the top surface of the plate 11 but for the limiting action of the central rib 33.

In the event that no adequate means such as the central rib 33 were provided, the body portion 32 of the gasket could be depressed downwardly to an extent that the edges of the ribs 25 and 26 might possibly damage portions thereof. Furthermore, it is possible that the body portion 32 could be deflected to an extent that the same would be buckled within the depressed portion 12 and upon the closing of the door no sealing action would be established with respect to the bottom edge thereof. The top surface 34 of the central rib 33 is positioned slightly below the top surface of the plate 11 and, as a result, does not normally come into contact with the inner surface of the body portion 32 unless a load caused by an object having a width less than that of the depressed portion 12 forces the body portion 32 downwardly into the depressed portion 12.

In Figs. 6–8 a modified form of sealing strip 36 is shown of elevated type adapted for use in sealing a movable surface which is spaced a substantial distance above the structural member which carries the strip. The main structural features of the strip 36 are identical with those described in connection with the strip 10 and, in these respects of similarity, corresponding parts are identified by like reference numerals. The main structural differences residing in the strip 36 as compared with the strip 10 are directed toward the elongation of the downwardly inclined outer portion 19' which provides the strip 36 along one side thereof with increased height. The opposite side of the strip 36 has integrally connected with the side wall 14 a downwardly directed supporting wall or leg 37, the bottom edge of which is provided with the V-shaped ribs 16 defining the teeth-like elements previously described. The provision of the elongated side portion 37 cooperates with the elongation of the opposite side portion 19' to provide the strip 36 with increased height thereby raising the remaining elements of the strip, including the depressed portion 12 and gasket 30, to an extent that efficient sealing action will occur between a movable surface spaced a substantial distance from the structural supporting base 24.

With the increase in height of the strip 36 by elongation of the side walls supporting the same, the bottom wall 15 of the depressed portion 12 becomes spaced a substantial distance above the top surface of the supporting base 24. Consequently, upon the fastening of the strip 36 to the base 24, the screws 23 cannot tension the base plate 11 into supporting contact with the supporting base 24 intermediate of the side margins thereof. To provide an intermediate supporting means between the downwardly depending sides 19' and 37, the side wall 13 of the depressed portion 12 has integrally formed therewith a depending rib or wall 38 which is continuous and extends the full longitudinal length of the strip 36. The rib 38 provides a centrally disposed supporting means or leg which, when the plate 11 is tensioned by the fastening screws 23, is brought into abutment with the top surface of the supporting base 24 as shown in Fig. 8. The abutting contact between the rib 38 and the supporting base 24 imparts strength to the strip 36 to an extent that the strip may function properly upon the application of considerable weight thereto without bowing or buckling. The advantageous sealing functions previously described in connection with the strip 10 are retained in the strip 36 in addition to the latter strip being designed for use in a different environment.

It should be obvious that the sealing means 10 and 36 of the present invention may be used to seal various movable surfaces and that the forms shown in the drawing are particularly designed for the sealing of bottom edges of doors. When used as a threshold the plate 11 is mounted at the bottom of the door frame in such a manner that the closing of the door brings the lower surface thereof into sealing engagement with the gasket 30. The height of the gasket 30 is adequate to promote tight sealing engagement with the bottom surface of a door and upon contact therewith the body portion 32 of the gasket 30 is flattened to an extent that a sealing contact of considerable area is established and maintained.

The door may be readily moved into and out of sealing engagement with the gasket 30 and it has been found that wear caused by such movement is practically negligible. In the event that it is necessary to replace the sealing gasket 30 the plate 11 may be readily removed from engagement with the top surface of the structural base 24 by retraction of the screws 23 and the old gasket may be withdrawn at one end of the plate 11 from its association with the grooves 27 and a new gasket reinserted in the same manner. The plate 11 is preferably formed from aluminum thereby providing an inexpensive threshold of lightweight construction which may be readily installed and maintained.

In the event that it is desired to use the plate with a hard mounting surface, such as marble, the spaced teeth 16 and 20 may be utilized to contain therebetween a sealing composition. The composition is spread in the grooves defined between the teeth and seals the longitudinal edges of the plate with the mounting surface. Under such circumstances it is still possible to tension the plate by means of the screws 23 or other fasteners to an extent that a portion of the bottom surface of the depressed portion or the rib 38 is brought into supporting abutment with the mounting surface.

This application is a continuation-in-part of my copending application, Serial No. 564,217, filed February 8, 1956, now abandoned.

Obviously many modifications and variations of the invention as hereinbefore set forth may be made without departing from the spirit and scope thereof, and therefore only such limitations should be imposed as are indicated in the appended claims.

I claim:

1. A threshold plate provided with a longitudinally extending depressed hollow portion having mounted therein an upwardly directed bowed sealing gasket covering said depressed portion and extending above said plate, an upstanding longitudinally extending rib in said depressed portion the top surface of which is of convex outline, said rib adapted to limit downward deflection of said gasket without harming the same, the convex curvature of the top surface of said rib further eliminating the sustaining of abrasive particles thereon capable of damaging said gasket upon contact of the same with said surface, and means associated with said plate for tensioning the same to at least partially bottom a surface associated with said depressed portion with respect to a base on which said plate is mounted.

2. A threshold plate provided with a longitudinally extending depressed hollow portion of substantial depth having mounted therein an upwardly directed bowed sealing gasket covering said depressed portion and extending above said plate, one side of said depressed portion inclined downwardly in an outward direction, the other side of said depressed portion having integrally formed therewith at the top thereof an outwardly directed flange member provided with a central substantially flat portion and an outer downwardly inclined portion, said depressed portion being provided with a substantially flat bottom surface of a width at least equal to the width of the interior of said depressed portion, and means associated with said plate for tensioning the same to at least partially bottom the flat bottom surface of said depressed portion with respect to a base on which said plate is mounted.

3. A threshold plate provided with a longitudinally extending depressed hollow portion having mounted therein an upwardly directed bowed sealing gasket covering said depressed portion and extending above said plate, one side of said depressed portion being inclined downwardly in an outwardly direction, the other side of said depressed portion having integrally formed therewith at the top thereof an outwardly directed flanged member provided with a central substantially flat portion and an outer downwardly inclined portion, said first side and said outer downwardly inclined portion of said flange member extending downwardly below said depressed hollow portion to support the same in spaced relation with the outer surface of a base on which said plate is mounted, a downwardly depending supporting rib carried by said plate intermediate the side margins thereof, and means associated with said plate for tensioning the same to engage said rib with the base on which said plate is mounted to provide said plate with support intermediate the side margins thereof.

4. A threshold plate provided with a longitudinally extending depressed hollow portion having mounted therein an upwardly directed bowed sealing gasket covering said depressed portion and extending above said plate, one side of said depressed portion being inclined downwardly in an outward direction, the other side of said depressed portion having integrally formed therewith at the top thereof an outwardly directed flange member provided with a central substantially flat portion and an outer downwardly inclined portion, said central portion being provided with a roughened frictional area along the top surface thereof, and plate fastening means receiving apertures extending downwardly through said area longitudinally spaced therealong, said depressed portion being provided with a substantially flat bottom surface of a width at least equal to the width of the interior of said depressed portion, the apertures of the central portion of said flange member being adapted to receive fastening means for tensioning said plate to at least partially bottom the flat bottom surface of said depressed portion with respect to a base on which said plate is mounted.

5. A threshold plate provided with a longitudinally extending depressed hollow portion having mounted therein an upwardly directed bowed sealing gasket covering said depressed portion and extending above said plate, one side of said depressed portion being inclined downwardly in an outward direction, the other side of said depressed portion having integrally formed therewith at the top thereof an outwardly directed flange member provided with a central substantially flat portion and an outer downwardly inclined portion, the outermost bottom edges of said inclined side and said flange member being provided with downwardly directed imbeddable teeth for gripping a base on which said plate is mounted, said depressed portion being provided with a substantially flat bottom surface of a width at least equal to the width of the interior of said depressed portion, and means associated with said plate for tensioning the same to at least partially bottom the flat bottom surface of said depressed portion with respect to a base on which said plate is mounted.

6. A threshold plate provided with a longitudinally extending depressed hollow portion having mounted therein an upwardly directed bowed sealing gasket covering said depressed portion and extending above said plate, said depressed portion being provided internally thereof with upwardly directed spaced ribs of arcuate outline cooperating with the side walls of said depressed portion to define semi-circular longitudinally extending grooves, said gasket being provided along the side margins thereof with semi-circular beads received in said grooves and substantially filling the same, said depressed portion being provided with a substantially flat bottom surface of a width at least equal to the width of the interior of said depressed portion, and means associated with said plate for tensioning the same to at least partially bottom the flat bottom surface of said depressed portion with respect to a base on which said plate is mounted.

7. A threshold plate provided with a longitudinally extending depressed hollow portion having mounted therein an upwardly directed bowed sealing gasket covering said depressed portion and extending above said plate, said depressed portion being provided internally thereof with upwardly directed spaced ribs of arcuate outline cooperating with the side walls of said depressed portion to define semi-circular longitudinally extending grooves, said gasket being provided along the side margins thereof with semi-circular beads received in said grooves and substantially filling the same, one side of said depressed portion having integrally formed therewith a downwardly inclined side wall member, the other side of said depressed portion having integrally formed therewith at the top thereof an outwardly directed flange member provided with a central substantially flat portion and an outer downwardly inclined side wall portion, said side wall portions extending below the bottom surface of said depressed portion a distance to space said depressed portion above and away from a base on which said plate is mounted, the innermost side wall of said depressed portion having integrally formed therewith a downwardly directed intermediate supporting wall which extends longitudinally of said plate, and means associated with said plate for tensioning the same to bring about engagement between the bottom edge of said intermediate wall with a base on which said plate is mounted to provide the same with intermediate support.

8. A threshold plate provided with a longitudinally extending depressed hollow portion having mounted therein an upwardly directed bowed sealing gasket covering said depressed portion and extending above said plate, said depressed portion being provided internally thereof with upwardly directed spaced ribs of arcuate outline cooperating with the side walls of said depressed portion to define semi-circular longitudinally extending grooves, said gasket being provided along the side margins thereof with semi-circular beads received in said grooves and substantially filling the same, an upstanding longitudinally extending deflection limiting rib in said depressed portion intermediate said spaced ribs, the top surface of which is of convex outline, said intermediate rib adapted to limit downward deflection of said gasket without harming the same, and means associated with said plate for tensioning the same to at least partially bottom a surface associated with said depressed portion with respect to a base on which said plate is mounted.

9. A threshold plate provided with a longitudinally extending depressed hollow portion having mounted therein an upwardly directed bowed sealing gasket covering said depressed portion and extending above said plate, said depressed portion being provided internally thereof with upwardly directed spaced ribs of arcuate outline cooperating with the side walls of said depressed portion to define semi-circular longitudinally extending grooves, said gasket being provided along the side margins thereof with semi-circular beads received in said grooves and substantially filling the same, an upstanding longitudinally extending further rib intermediate said spaced ribs in said depressed portion the top surface of which is of convex outline, said further rib adapted to limit downward deflection of said gasket without harming the same, one side of said depressed portion being inclined downwardly in an outward direction, the other side of said depressed portion having integrally formed therewith at the top thereof an outwardly directed flange member provided with a central substantially flat portion and an outer downwardly inclined portion, and means associated with said plate for tensioning the same to at least partially bottom a surface associated with said depressed portion with respect to a base on which said plate is mounted.

10. A threshold plate provided with a longitudinally extending depressed hollow portion having mounted therein an upwardly directed bowed sealing gasket covering said depressed portion and extending above said plate, said depressed portion being provided internally thereof with upwardly directed spaced ribs cooperating with the side walls of said depressed portion to define longitudinally extending grooves, the longitudinally extending margins of said gasket being received in said grooves to mount the gasket with respect to said plate, and an upstanding longitudinally extending gasket deflection limiting rib in said depressed portion intermediate said spaced ribs, the top surface of which is of convex outline, said intermediate rib being adapted to limit downward deflection of said gasket without harming the same.

11. A threshold plate provided with a longitudinally extending depressed hollow portion having mounted therein an upwardly directed bowed sealing gasket covering said depressed portion and extending above said plate, said depressed portion being provided internally thereof with upwardly directed spaced ribs of arcuate outline cooperating with the side walls of said depressed portion to define semi-circular longitudinally extending grooves, said gasket being provided along the side margins thereof with semi-circular beads received in said grooves and substantially filling the same, and an upstanding longitudinally extending deflection limiting rib in said depressed portion intermediate said spaced ribs, the top surface of which is of convex outline, said intermediate rib adapted to limit downward deflection of said gasket without harming the same.

12. A threshold plate provided with a longitudinally extending depressed hollow portion of substantial area having mounted therein an upwardly directed bowed sealing gasket covering said depressed portion and extending above said plate, grooves carried by said plate receiving the longitudinal margins of said gasket to maintain said gasket in its bowed condition, and an upstanding rib intermediate said grooves and within said depressed portion to limit the extent of deflection of said gasket into said depressed portion.

13. A threshold plate provided with a longitudinally extending depressed hollow portion of substantial area having mounted therein an upwardly directed bowed sealing gasket covering said depressed portion and extending above said plate, grooves carried by said plate receiving the longitudinal margins of said gasket to maintain said gasket in its bowed condition, and an upstanding rib intermediate said grooves and within said depressed portion to limit the extent of deflection of said gasket into said depressed portion, said rib extending longitudinally of said depressed portion and being provided with a convex upper surface for contact with said gasket upon extreme deflection thereof without harming the same.

14. A threshold plate provided with a longitudinally extending depressed hollow portion of substantial area having mounted therein an upwardly directed bowed sealing gasket covering said depressed portion and extending above said plate, grooves carried by said plate receiving the longitudinal margins of said gasket to maintain said gasket in its bowed condition, an upstanding rib intermediate said grooves and within said depressed portion to limit the extent of deflection of said gasket into said depressed portion, said rib extending longitudinally of said depressed portion and being provided with a convex upper surface for contact with said gasket upon extreme deflection thereof without harming the same, the side margins of said plate being defined by downwardly depending plate-supporting wall members the bottom edges of which extend substantially below the bottom surface of said depressed portion and are adapted for contact with a base on which said plate is mounted, and an intermediate supporting wall integral with said plate and depending downwardly therefrom centrally with respect to said wall members and adapted for contact with a base on which said plate is mounted to centrally support said plate.

15. A threshold plate provided with a longitudinally extending depressed hollow portion of substantial depth and area having mounted therein an upwardly directed bowed sealing gasket covering said depressed portion and extending above said plate, a groove defined along each longitudinal side margin of said depressed portion by upwardly directed longitudinally extending ribs positioned inwardly of each side margin and formed integral with the bottom of said depressed portion, said grooves receiving the longitudinal margins of said gasket to maintain said gasket in its bowed condition.

16. A threshold plate provided with a longitudinally extending depressed hollow portion of substantial depth and area having mounted therein an upwardly directed bowed sealing gasket covering said depressed portion and extending above said plate, a groove defined along each longitudinal side margin of said depressed portion by upwardly directed longitudinally extending ribs positioned inwardly of each side margin and formed integral with the bottom of said depressed portion, said grooves receiving the longitudinal margins of said gasket to maintain said gasket in its bowed condition, and plate supporting side portions formed integral with said depressed portion along each side thereof, said plate supporting portions extending transversely outwardly from said depressed portion to provide said plate with a substantially flat top surface to at least one side of said sealing gasket, the outer bottom surface of said depressed portion lying in a single continuous plane which coincides at least substantially with the bottom surface of one of said plate supporting side portions.

17. A threshold plate provided with a longitudinally extending depressed hollow portion of substantial depth and area having mounted therein an upwardly directed bowed sealing gasket covering said depressed portion and extending above said plate, a groove defined along each longitudinal side margin of said depressed portion by upwardly directed longitudinally extending ribs positioned inwardly of each side margin and formed integral with the bottom of said depressed portion, said grooves receiving the longitudinal margins of said gasket to maintain said gasket in its bowed condition, and an upstanding rib intermediate said grooves and within said depressed portion to limit the extent of deflection of said gasket into said depressed portion.

References Cited in the file of this patent

UNITED STATES PATENTS

| 1,178,859 | Krause | Apr. 11, 1916 |
| 1,795,853 | Glass | Mar. 10, 1931 |
| 2,718,677 | Cornell | Sept. 27, 1955 |

OTHER REFERENCES

Architectural Engineering, page 200, November 1948, class 20, subclass 64. (Copy in Division 53.)